(12) United States Patent
Yagawa

(10) Patent No.: US 7,434,057 B2
(45) Date of Patent: Oct. 7, 2008

(54) SYSTEM AND METHOD FOR WATERMARKING IN ACCESSED DATA IN A STORAGE SYSTEM

(75) Inventor: Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 11/043,072

(22) Filed: Jan. 27, 2005

(65) Prior Publication Data
US 2006/0168450 A1    Jul. 27, 2006

(51) Int. Cl.
*H04L 9/00* (2006.01)
(52) U.S. Cl. ..................... 713/176; 726/26
(58) Field of Classification Search .................. 726/26, 726/31–33; 713/176; 380/54, 201–203; 382/100
See application file for complete search history.

(56) References Cited

U.S. PATENT DOCUMENTS

| | | | |
|---|---|---|---|
| 5,822,432 A | * | 10/1998 | Moskowitz et al. ............ 380/28 |
| 6,522,769 B1 | * | 2/2003 | Rhoads et al. .............. 382/100 |
| 6,785,815 B1 | * | 8/2004 | Serret-Avila et al. ......... 713/176 |
| 2003/0161468 A1 | | 8/2003 | Iwagaki et al. |

* cited by examiner

*Primary Examiner*—Hosuk Song
(74) *Attorney, Agent, or Firm*—Mattingly, Stanger, Malur & Brundidge, P.C.

(57) ABSTRACT

A system and method for watermarking data that includes a client device, a file system manager, a file server, and a storage network. The file system manager sets watermark control information. The file server includes: (1) a file writing process including a file watermark examination procedure and an action procedure, the action procedure determining an action based on a result of the file watermark examination; and (2) a file reading process including a watermark definition procedure, a file handle/memory preparation procedure, a file data copy procedure, and a watermark insertion procedure. During a read request the watermark definition procedure determines whether a file to be read is to be watermarked based on a user at the client device that requested to read the file. Whether a write request is processed or not is based on the user and whether the file to be written contains a watermark.

26 Claims, 9 Drawing Sheets

FIG. 4: Watermark Control Information

| UID/GID | Copyright Information | File Content Information | Use Rights Information | --- | |
|---|---|---|---|---|---|
| Owner | NULL | NULL | NULL | --- | ~ 410 |
| User 1 | XXX | NULL | NULL | --- | ~ 411 |
| User 2 | XXX | YYY | ZZZ1 | --- | ~ 412 |
| --- | --- | --- | --- | --- | |
| Group 1 | NULL | YYY | NULL | --- | ~ 413 |
| Group 2 | XXX | YYY | ZZZ2 | --- | ~ 414 |
| --- | --- | --- | --- | --- | |
| Other | XXX | YYY | ZZZ3 | --- | ~ 415 |

FIG. 5: Data Structure of Copyright Information

| File Attribute | Data Type | Example | |
|---|---|---|---|
| Copyright Holder | String | Hitachi Ltd. | ~ 510 |
| Copyright Date | Time | 4/1/2004 | ~ 511 |
| Copyright Notice | String | Copyright © 2004 by Hitachi Ltd. All rights reserved. | ~ 512 |

FIG. 6: Data Structure of File Content Information

| File Attribute | Data Type | Example | |
|---|---|---|---|
| File Name | String | Picture 1 | ~ 610 |
| File Type | Enumeration | JPEG | ~ 611 |
| Description | String | This picture was taken by Mr. Yuichi Yagawa in March 2004. The content is an experimental result of AAA drug test. | ~ 612 |

FIG. 7: Data Structure of Use Right Information

| File Attribute | Data Type | Example |
|---|---|---|
| User | String | Nobuyuki Osaki |
| Date of Use | Time | 8/1/2004 |
| Period of Use | Time | 60 days |
| Type of Use | Enumeration | Read Only |
| Process after Use | Enumeration | Shredding |

700, 701, 702 — column headers
710, 711, 712, 713, 714 — rows

Fig. 8: Watermark related Process flow in File Reading

FIG. 10 (a): Watermark Examiner in Client

FIG. 10 (b): Watermark Examiner in GW Server

FIG. 10 (c): Watermark Examiner in File Server

SYSTEM AND METHOD FOR WATERMARKING IN ACCESSED DATA IN A STORAGE SYSTEM

BACKGROUND

1. Field of the Invention

This invention relates to a storage networking system, and more specifically to a file server system or a network attached storage (NAS) system configured to achieve protection of data or a file using watermarking.

2. Description of the Related Art

One of the main expectations for a storage networking system is to share data from several hosts or users on consolidated storage resources. A file server system or a Network Attached Storage system (NAS) is a typical example of a system to achieve these expectations. A file server may include elements of a typical computer such as, for example, a processor, memory, and input/output (I/O) handling capabilities. Both systems are storage networking systems to provide file IF (interface). A Content Addressable Storage (CAS) system is another example of a system to achieve these expectations. Originally, CAS products have been used to provide object IF, however, recent CAS products also provide file IF.

Recently, increasing storage security or data security has become one of the main requirements from customers. Copyright protection is one example for satisfying these requirements. In this regard, customers want to share data or files within users, but they also want to protect an owners' right from any infringement from the users. Current storage networking systems cannot solve this requirement. For example, NAS only provides file access control mechanism using ACL (access control list), which does not protect copyrights on the file.

U.S. patent application Ser. No. 20030161468 discloses a NAS system that inserts a watermark into a file when the file is stored into a NAS system. Because the inserted watermark describes copyright information in the file, the system can protect any copyright violation from users psychologically. Also, it is easy to find copyright violation, because infringing copy of the file still contains the watermark.

On the other hand, Watermark or Digital Watermark is a well known technology that enables additional information (watermark information) to be inserted or embedded into data or contents, such as image, picture, motion picture, sound, and so on. If the watermark information contains copyright information, it can protect copyright violation in terms of psychological point of view. Also, even if the copyright violation occurs, it is much easier to detect the violation, since most of the current watermark technologies enable the watermark still to exist in the violated data.

There are two types of Watermark technologies, visible watermark and invisible watermark. The visible watermark directly shows additional information such as copyright notices to users, which prevent users psychologically from violating the copyright. The invisible watermark hides the information inside data. In other words, humans cannot notify the information in the data. This is achieved by inserting the information into specific part of the data where humans visually or acoustically cannot identify.

Therefore, there is a need for copyright protection functionalities on a file server system, a NAS system, a CAS system or any other storage networking systems, without impacting any other changes to the existing IF, e.g. File IF.

SUMMARY OF THE INVENTION

A system and method for watermarking in accessed data that includes a client device, a file system manager, a file server, and a storage network. The client device is connected to a network and includes a file access application. The file system manager is connected to the network and sets watermark control information. The file server is connected to the network and includes: (1) a file writing process including a file watermark examination procedure and an action procedure, the action procedure determining an action based on a result of the file watermark examination; and (2) a file reading process including a watermark definition procedure, a file handle/memory preparation procedure, a file data copy procedure, and a watermark insertion procedure. The storage network is operatively connected to the file server and includes at least one storage device. During a read request the watermark definition procedure determines whether a file to be read is to be watermarked with a watermark based on a user at the client device that requested to read the file. During a write request, whether the write request is processed or not is based on the user and whether the file to be written contains a watermark.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

According to embodiments of the present invention, if a file server 100 receives a file open request to read the file from a client 180, the file server: (1) determines whether or not the requested file is watermarked based on the requesting user information, and determines the content of the watermark in case the file needs to be watermarked, (2) prepares a specific file handle to point to a memory area (e.g., cache memory) storing the watermarked file, thus separating the watermarked file from the original file to make sure that normal file read requests can access the original file through the original file handle, (3) copies file data from the original file into the memory area, which will be accessed through the specific file handle, and (4) inserts the prepared watermark in the copied file data in the memory area.

According to embodiments of the present invention, since any file read requests are executed through the specific handle and its associated data in the memory, there is no need to modify the existing protocols or the client programs. Further, because the watermark may contain not only copyright information, but also use right information, the watermark can provide users psychologically peace of mind regarding any possible infringement of the copyright and/or the use right. Moreover, the watermark examination methods may be provided in a client device, a gateway, a file server or any other components in the system to allow easy detection of copyright violations, and execution of any follow-up actions. The follow-up actions may be based on predefined policies or rules if copyright or other violations are detected. Embodiments of the present invention may also be used to embed additional information, such as content description or any other metadata, inside the data itself. The embedded information can be used to provide better services such as, for example, data search, autonomous management using meta data, etc. One example of autonomous management is data lifecycle management that enables data to be managed in appropriate tiered storage devices, such as expensive high performance and reliability storage devices, and inexpensive low performance storage devices.

Figure 1:
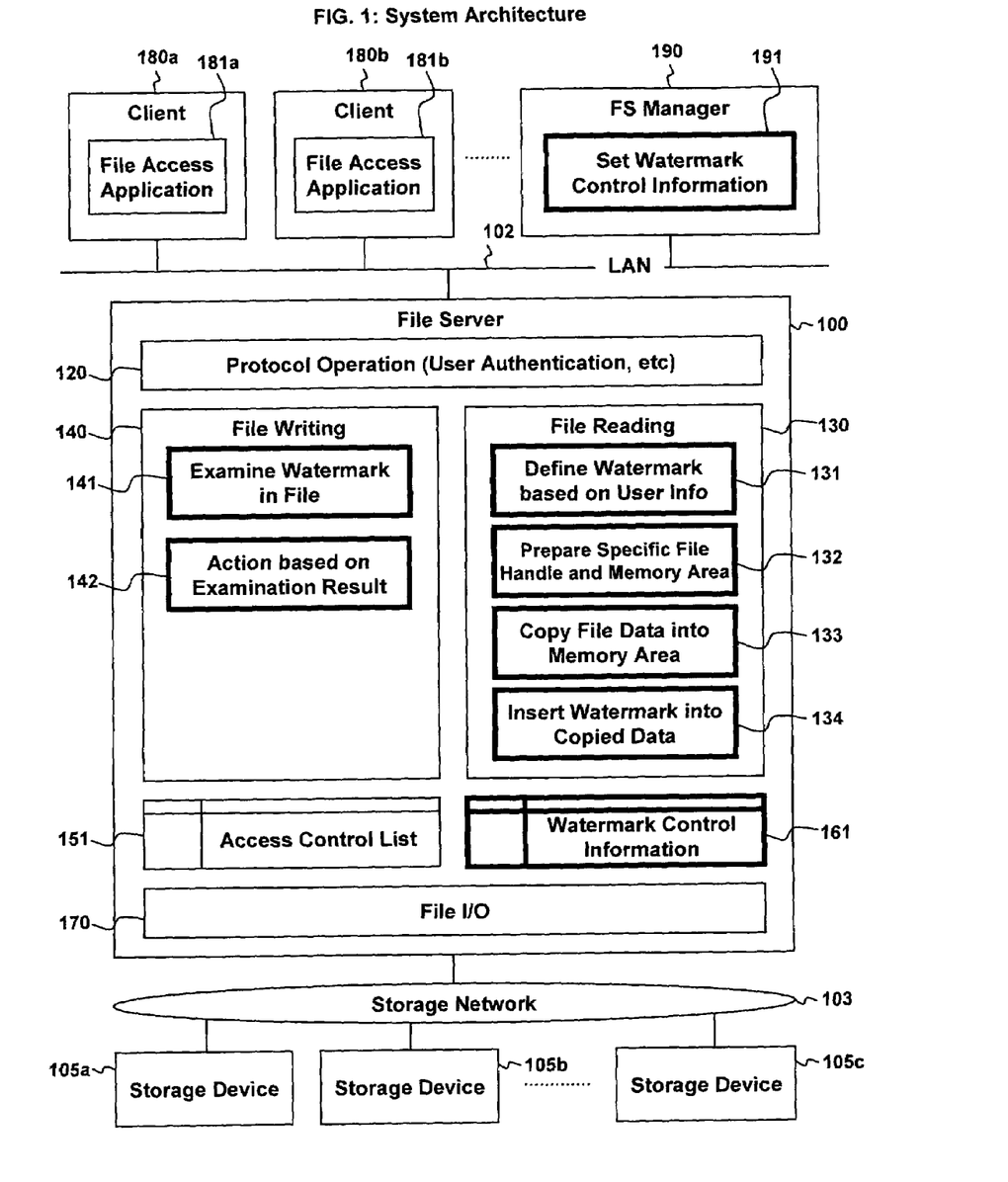
FIG. 1 is a block diagram of a system for watermarking in accessed data according to an example embodiment of the present invention.

FIG. 1 shows a block diagram of a system for watermarking in accessed data according to an example embodiment of the present invention. The bold boxes indicate just some of the novel features of this invention that are not currently available. The system includes one or more clients 180, a file server (FS) 100, and a FS manager 190, which may be connected through a Local Area Network (LAN) 102. The numbers of file servers and FS managers in the overall system are not limited to only one, but may be any number and still be within the scope of the present invention. The file server 100 provides network based file system services to clients 180. Some examples of the file system protocols that may be implemented include, for example, NFS (Network File System), CIFS (Common Internet File System), DFS (Distributed File System), AFS (Andrew File System), AFP (Appletalk Filing Protocol), NCP (Netware Core Protocol), FTP (File Transfer Protocol), HTTP (Hypertext Transfer Protocol), etc. An administrator may manage the file server 100 through the FS manager 190.

The file server 100 may be connected to several storage devices 105 through a Storage Area Network (SAN) 103. Some examples of storage area network protocols include SCSI (Small Computer System Interface), Fibre Channel, FICON (Fibre Connectivity), ESCON (Enterprise Systems Connectivity), etc. The storage devices 105 provide data storing services to the file server 100. The file server 100 may be a NAS Gateway or NAS Head, and the file server 100 combined with the storage devices through storage networks may also be called "NAS" itself. Further, according to embodiments of the present invention, CAS can be achieved using the same system architecture shown in FIG. 1.

The clients 180 may contain applications 181 that access files. The clients 180 may also contain FS client programs, which are not shown in the diagram. Some examples of these programs include NFS client, CIFS client, HTTP client, etc. According to this embodiment of the present invention, the system can use ordinary client programs even if there are new functionalities (described following) provided by the file server 100.

A typical file server 100 may include a protocol operation program 120, several file service programs such as, for example, File Open, File Create, File Read, File Write, File Seek, File Close, control information, and a File I/O (input/output) program 170. The protocol operation program 120 may handle common services for file service programs such as, for example, protocol understanding, user authentication, access control, etc. Through the protocol operation program 120, a particular file service may be provided to the clients 180. To help illustrate this embodiment of the present invention, FIG. 1 describes particular processes of file services, e.g., File Reading 130 and File Writing 140, in contrast to describing each file service program. These processes may consist of several file service procedures.

A File Reading process 130 may contain sub-processes or procedures related to (1) define watermark based on user information 131, (2) prepare specific file handle 132, (3) copy file data to specific file handle 133, and (4) insert watermark into specific file handle 134. A define watermark based on user information process 131 may determine whether or not the system inserts a watermark into the requested file based on the requesting user information. For example, if the requesting user is asked to use the file in restricted condition, the watermark that indicates the condition would be inserted. This process may also define the content of the watermark itself if the file needs to be watermarked. The content may also depend on the requesting user and/or the requesting environment such as, for example, date and time.

Inserting the watermark into the file means that the watermarked file itself becomes different from the original file itself, but its size and other metadata may be the same as the original so that the watermarked file mimics the original and make clients process the file under the same way as the original. Therefore, a Prepare Specific File Handle process 132 may be necessary to prepare another file handle to point the watermarked file to make sure that normal file read requests can access the original file through the original file handle.

Generally speaking, a unit of watermarking is different from a unit of a file read request. Therefore, it may be convenient that all watermarking processes be done before any file read procedure occurs. A Copy File Data to Specific File Handle process 133 copies file data into the cache memory to prepare watermarking method. The memory area is generally accessed through the file handle. An Insert Watermark into Specific File Handle process 134 inserts the prepared watermark in the copied file data in the memory area. This embodiment of the present invention does not depend on any specific watermarking technologies, as the watermarking methods used may depend on each specific implementation. The watermarking technologies may be required to be robust enough for any editing.

A File Writing process 140 may also contain sub-processes or procedures related to (1) examine watermark in file process 141 and (2) action based on examination result process 142. Before the file is closed, an examine watermark in file process 141 may examine the file to determine if any watermark is contained in the file. This embodiment of the present invention does not depend on any specific watermark examination technologies, as the watermark examination process used may depend on each specific implementation of the present invention.

If a watermark is detected, an appropriate action is taken. For example, if the watermark indicates that the user is not allowed to keep the copy or any modification, an Action based on Examination Result process may provide an alert message to the client and refuse to save the file. The action taken may depend on predefined rules or policies. These predefined rules/policies may be pre-stored at the file server or stored/updated dynamically. Moreover, these rules/policies may be stored in the file as the watermark.

Some examples of control information include Access Control List (ACL) 151 and Watermark Control Information 161. An ACL 151 defines access control to a file that may have been received from a user. Also, a Watermark Control Information 161 defines watermark control received from a user regarding a file. Based on the control information, the define watermark process 131 defines a watermark. According to this embodiment of the present application, the file server 100 contains the watermark control information 161. A File I/O process 170 handles data I/O in the file server 100 to and from a storage network 103. This process may be the same as in an ordinary file server.

A FS Manager 190 may provide an interface, such as a Graphical User Interface (GUI) or a Command Line Interface, for users to manager the file server 100. According to this embodiment of the present invention, the FS Manager 190 may contain a process 191 of setting watermark control information. This process provides an interface to input or edit the watermark control information 161. According to the embodiments of the present invention, a file reading process 130 contains the process of inserting the watermark, in contrast to the prior art in which the writing process contains the method of inserting the watermark. Although the embodiment of the present invention shown in FIG. 1 is based on a file IF and a file server, the same processes discussed in this embodiment can be applied to any type of IF, such as for example, block or object.

Figure 2:
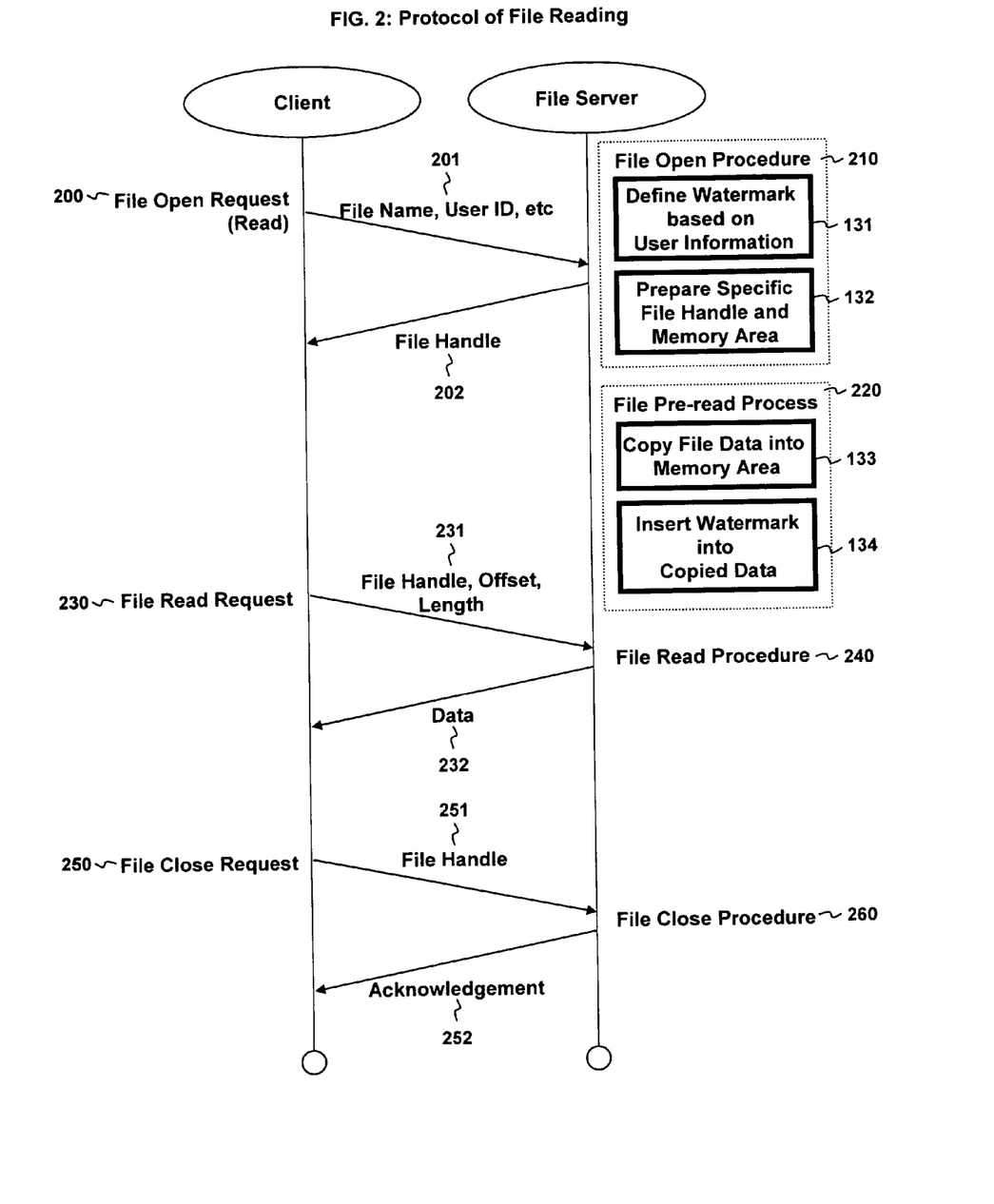
FIG. 2 is a diagram of a file reading protocol between clients and a file server according to an example embodiment of the present invention.

FIG. 2 shows a diagram of a file reading protocol between clients and a file server according to an example embodiment of the present invention. This figure illustrates a file reading process between the clients 180 and the file server 100. In this embodiment the file server is stateful and contains client state information. In a case of a stateless server, each process will be explained following. In this embodiment, there may be no new processes in the client or protocols added, but new processes may be added in the file server 100. Some of these new processes are highlighted in FIG. 2, and the other parts may be the same as in an ordinary file reading protocol.

The client may include processes for a File Open Request 200, a File Read Request 230, and a File Close Request 250. The client 180 may issue a File Open Request 200 to read the file from the file server 100. The request 200 is sent to the file server 100 with parameters 201 such as for example but not limited to, a File name, a User ID, etc. A Session ID may be sent to the file server 100, instead of sending the User ID, if a session between the client 180 and the file server 100 is established after the user has logged into the file server the first time. At the file server 100, a file open procedure 210 may be executed after the file server 100 receives the request 200 with the parameters 201 from the client 180. According to this embodiment of the present invention, the process of defining a watermark based on user information 131 and the process of preparing a specific file handle 132 may be executed as parts of a file open procedure 210. Further, according to this embodiment of the present invention, the file open procedure 210 returns a file handle 202, a specific file handle in the case that the watermark will be inserted into data copied from the file handle into a memory area at the specific file handle, otherwise, the procedure returns an ordinary file handle. In a case where metadata, such as file size, is changed after watermarking the data at the specific file handle, a new metadata area is prepared and filled with non-changed and changed metadata. The system lets the specific file handle identify the new metadata area. However, this may be a rare case since the client may prepare its memory space for the file before the file is read from the server and, therefore, its memory size should be the same as the original file size. Further, ordinary watermarking technology may not change the size of original files.

After the file is opened, the file server prepares for a file read procedure. In general, the file server may pre-read the file, or a part of the file, into its cache memory to accelerate the file read procedure. According to this embodiment of the present invention, the pre-read process 220 may contain the process of copying the file data to a memory area at the specific file handle 133 and the process of inserting the prepared watermark into the copied data 134. These two processes may also be executed in a case where the file needs to be watermarked under a file read request 230. However, if a file server does not support the pre-read process, the file read procedure 240 may contain the process of copying a requested part of the file data to a memory area at the specific file handle 133 and the process of inserting the prepared watermark into the copied data 134.

The client 180 may issue a File Read Request 230 with some parameters 231 such as, for example, file handle, offset, length, etc. The file server 100 executes a File Read Procedure 240, which reads data from the memory area (e.g., cache memory) at the file handle with the condition of the offset and the length and returns the data 232 to the client 180. According to this embodiment of the present invention, the client can gain access to the watermarked file data using the specific file handle without modifying the ordinary protocol used by the client.

The client 180 may issue a File Close Request 250 with the file handle 251. The file server 100 may execute a File Close Procedure 260, which releases the file handle and returns an acknowledgement 252 to the client 180. According to this embodiment of the present invention, the procedure may also release the memory spaces of watermarked data and its metadata identified by the file handle in a case that either of them is prepared. This process is not shown in the FIG. 2.

In the case of a stateless file server, there is no File Open Request process or File Open Procedure. Instead of the request, the file server monitors a File Read Request from a particular user and a client and considers the very first File Read Request as being the same as a File Open Request. Then the file server executes the same process described in the File Open process 210 and the File Pre-read process 220 above within the File Pre-read Process. Further, the status of the file read request may be managed with a timestamp. If the duration between each File Read Request exceeds a certain time, the file server realizes that the file is closed.

Figure 3:
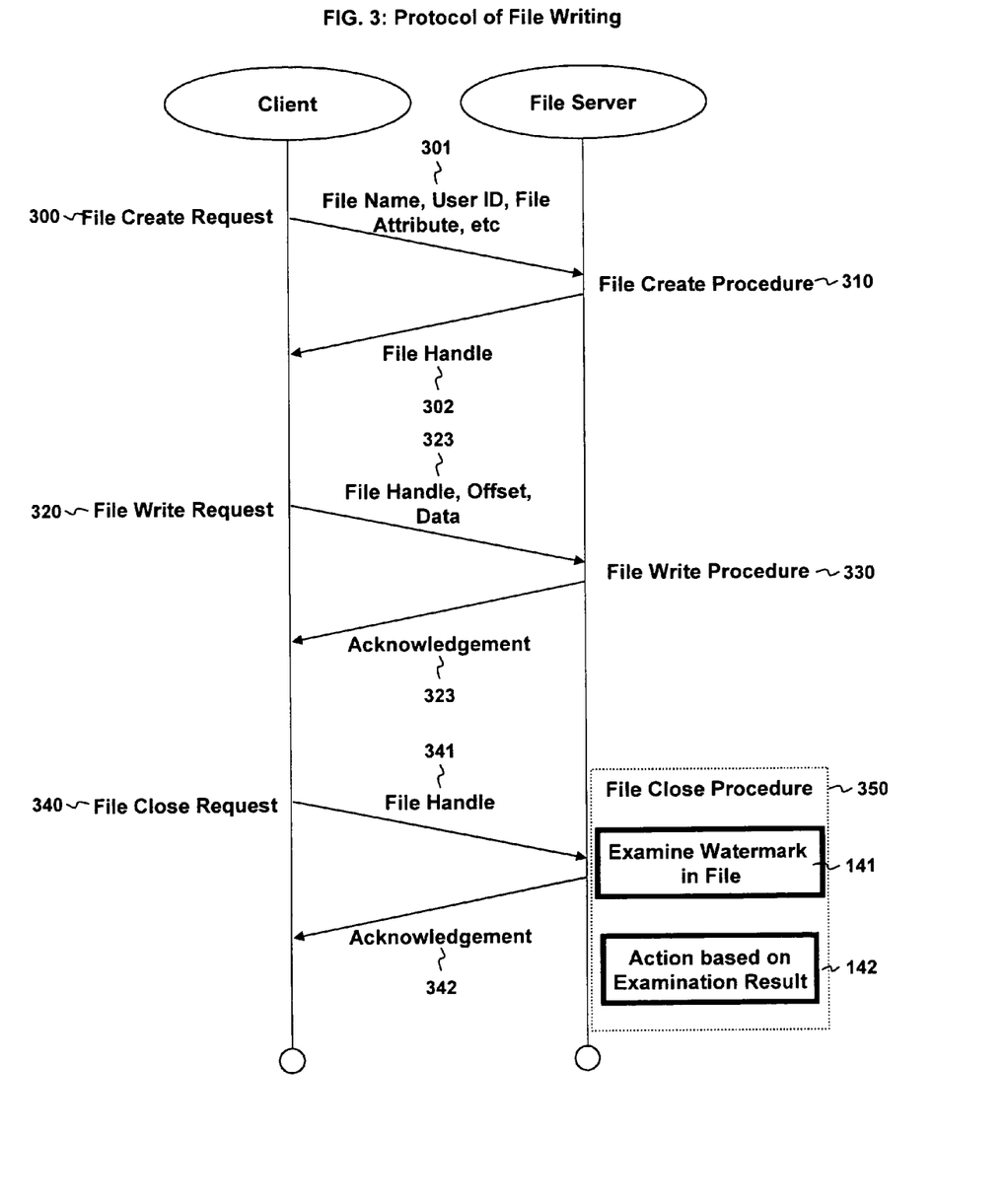
FIG. 3 is a diagram of a file writing protocol between clients and a file server according to an example embodiment of the present invention.

FIG. 3 shows a diagram of a file writing protocol between clients and a file server according to an example embodiment of the present invention. This figure illustrates a file writing process between the clients 180 and the file server 100. In this embodiment the file server is stateful and contains client state information. In a case of a stateless server, each process will be explained following. In this embodiment, there may be no new processes in the client or protocols added, but new processes may be added in the file server 100. Some of these new processes are highlighted in FIG. 3, and the other parts may be the same as in an ordinary file writing protocol.

In general, the file server may temporarily save the written data into its cache memory in case of file write request, and store the overall file data into the disk in case of the file close request. The example embodiment shown in FIG. 3 supposes this case. Further, in another embodiment of the present invention, the server may store the written data into the disk every time when the server receives the file write request with the data. In this case, the file write procedure itself may contain the processes of examining watermark in a file and action based on the examination result.

The client may include processes for a File Create Request 300, a File Write Request 320, and a File Close Request 340. The client 180 may issue a File Create Request 300 with some parameters 301 such as, for example but not limited to, a File name, a User ID, File Attributes, etc. The file server 100 may execute a File Create Procedure 310, which creates a new file handle for the new file and returns the file handle to the client 180. In another embodiment of the present invention, a file create request may not be issued. The client 180 may issue a File Write Request 320 with some parameters 321 such as, for example, the file handle, an offset, the data to be written, etc. The file server 100 executes the File Write Procedure 330, which writes data into a memory space at the file handle with the condition of the offset, and returns an acknowledgement.

The client 180 may issue a File Close Request 340 with some parameters 341 such as, for example, the file handle, etc. The file server 100 executes the File Close Procedure 350, which may release the file handle and returns an acknowledgement 342 to the client 180. According to this embodiment of the present invention, an Examine Watermark in File process 141 that examines a watermark in the file specified by the file handle, and an Action based on Examination Result process 142 that executes an action based on the examination result, are present. These processes are useful to detect any copyright violation before the infringed file is stored into the file server 100, which may be used and shared by many devices.

In the case of a stateless file server, there may be no File Close Request and no File Close Procedure. Therefore, the Examine Watermark in File process 141 and the Action based on Examination Result process 142 may be executed in a post-write process in which file data in the cache memory is stored in the storage devices. In another embodiment of the present invention, the file server 100 may monitor a specific event such as a releasing file lock event and then executes the Examine Watermark in File process 141 and the Action based on Examination Result process 142.

Figure 4:
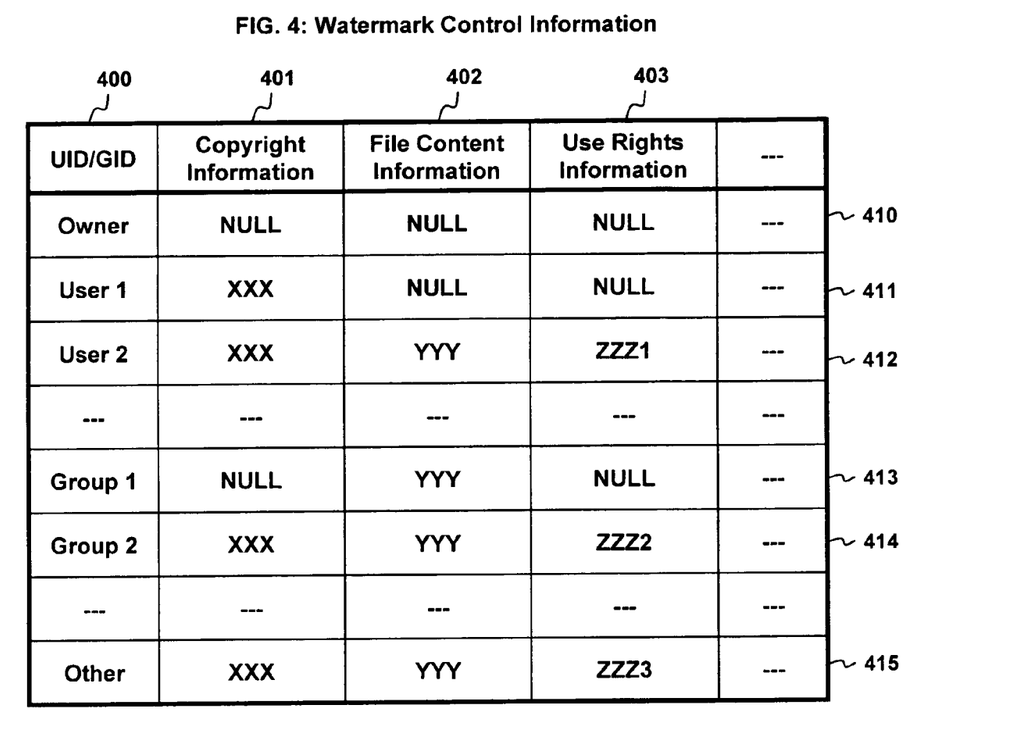
FIG. 4 is diagram of example watermark control information for a file according to an example embodiment of the present invention.

FIG. 4 shows diagram of example watermark control information for a file according to an example embodiment of the present invention. This example watermark control information 161 is defined for each file and each user or group of users, as shown in the figure. The column 400 indicates the User ID or the Group ID. For each user or group the watermark control information may be defined. The columns 401, 402 and 403 indicate the Copyright Information, File Content Information, and Use Right Information, respectively, that may be watermarked into the file. Other information may be watermarked into the file depending on desires or implementation as represented by the extra column. There may be many other types of information (i.e., columns) and still be within the scope of the present application. Examples of some of the information are explained later.

The rows 410, 411, 412, 413, 414 and 415 describe examples of watermark control information. In each entry, "NULL" indicates that the information does not need to be watermarked. If all entries are "NULL" in a row as the row 410 shows, this indicates no information needs to be watermarked. Also, "XXX", "YYY" and "ZZZ1" are just examples of the information representing watermarks.

Figure 5:
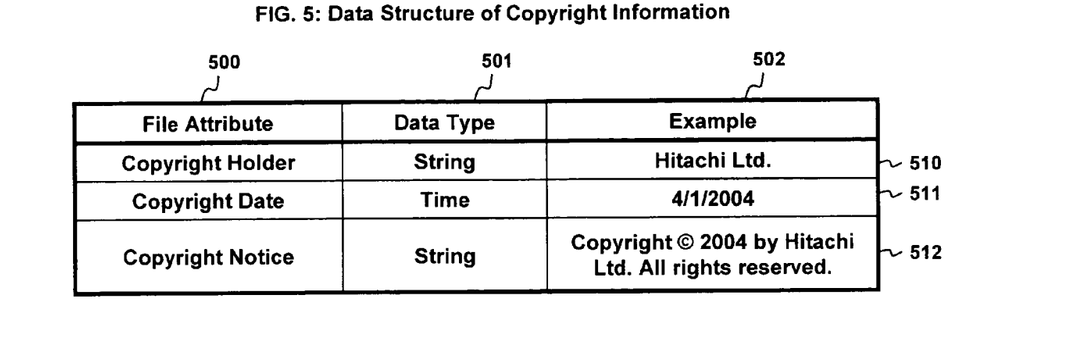
FIG. 5 is a diagram of a data structure of Copyright Information according to an example embodiment of the present invention.

FIG. 5 shows a diagram of a data structure of Copyright Information according to an example embodiment of the present invention. The data structure of the Copyright Information 401 may include information shown in column 500 regarding a Copyright Holder 510, a Copyright Date 511, and a Copyright Notice 512. Examples of this information are shown in column 502. Data type of the information is shown in column 501. The type of data may determine how or where this portion of the watermark is inserted. Further, note that according to embodiments of the present invention, the information may also be defined for each pair of a file and a user or a group.

Figure 6:
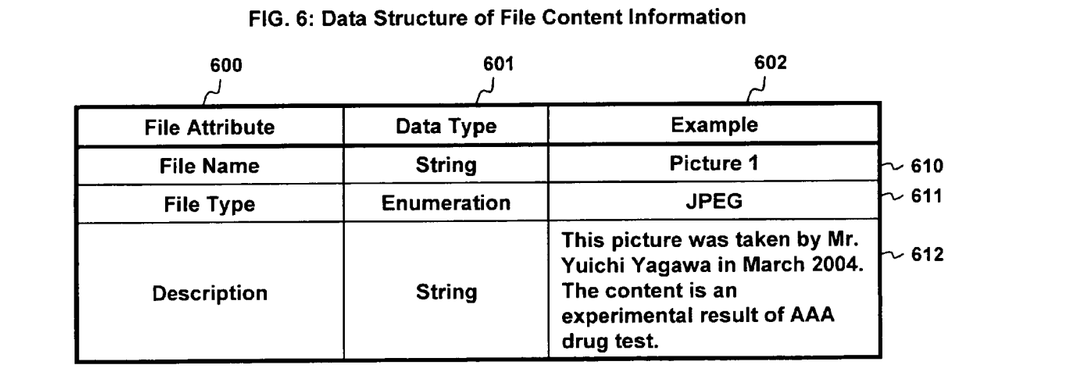
FIG. 6 is a diagram of a data structure of File Content information according to an example embodiment of the present invention.

FIG. 6 shows a diagram of a data structure of File Content information according to an example embodiment of the present invention. This example data structure of the File Content information 402 may include information shown in column 600 related to a File Name 610, a File Type 611, and a Description 612. Examples of this information are shown in column 602. Each information 600 may also have a data type as shown in column 601. The file type 611 may determine how a watermark may be inserted into the data in the file. Further, note that according to embodiments of the present invention, the information may be defined for each pair of a file and a user or a group.

Figure 7:
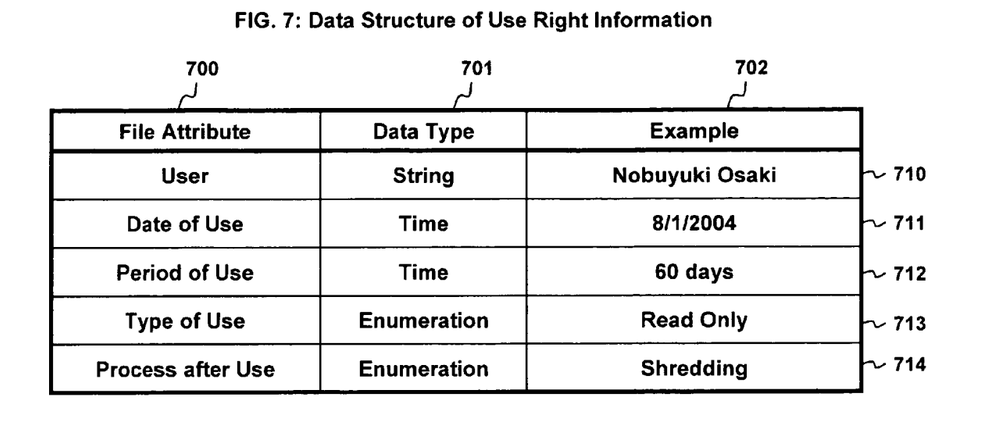
FIG. 7 is a diagram of a data structure of the Use Right Information according to an example embodiment of the present invention.

FIG. 7 shows a diagram of a data structure of the Use Right Information according to an example embodiment of the present invention. This example data structure of the Use Right Information 403 may include information shown in column 700 related to a User 710, a Date of Use 711, a Period of Use 712, a Type of Use 713 and a Process after Use 714. Examples of this information are shown in column 702. Data types are shown in column 701. Also note that the information may be defined for each pair of a file and a user or a group and still be within the scope of the present invention. According to this embodiment of the present invention, the watermark control information contains the Use Right Information, which may vary whenever the file is requested and opened.

Figure 8:
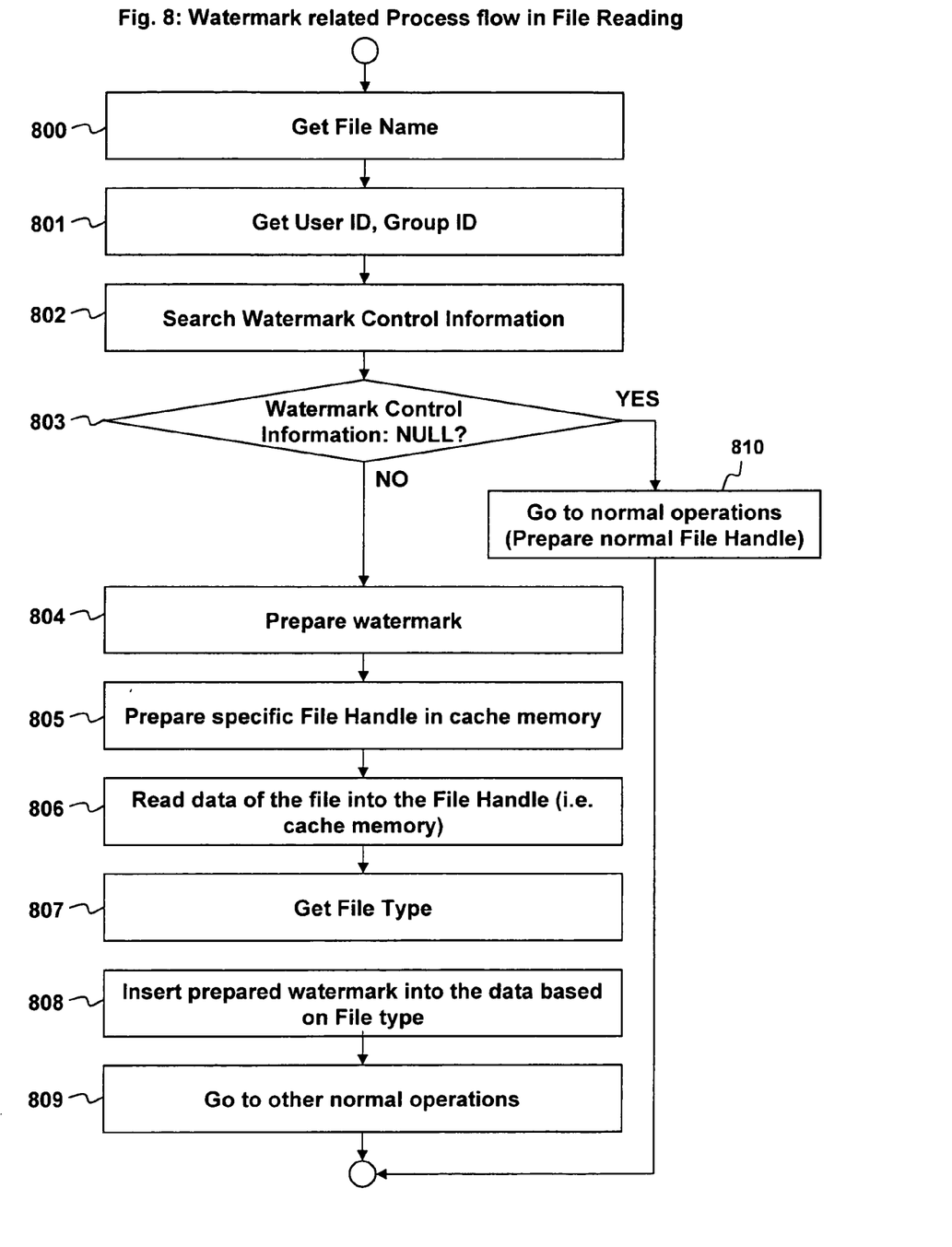
FIG. 8 is a flowchart of a file reading process according to an example embodiment of the present invention.

FIG. 8 shows a flowchart of a file reading process according to an example embodiment of the present invention. This file reading process may occur in the file server 100, however, the present invention is not limited by this embodiment or implementation. A file name is obtained, 800. As described in FIG. 2, the file name may be provided as a parameter of a File Open Request 200. A user ID or a group ID is obtained, 801. Again, as shown in FIG. 2, the user ID may be provided as a parameter of a File Open Request 200. The group ID may be retrieved from a user database such as, for example, Password File, LDAP, etc. by using the user ID as a key. Particular watermark control information specified by the file name and the user ID or the group ID is searched from all watermark control information, 802. An example of the searched information is shown in a row 410-415 in FIG. 4. The result of the search is checked, 803. If the watermark control information are all "NULL", then it is identified that the file does not need to be watermarked and the process goes back to the normal process to prepare a normal File Handle, 810, otherwise, it is identified that the file needs to be watermarked and a watermark is prepared to be inserted into the file, 804. The searched Copyright Information, File Content Information, Use Right Information and other information if defined may be packed into the watermark.

A memory area may be prepared, for example, in a cache memory, 805. The file handle may be used to specify the file data to be watermarked. Data of the file is copied into a memory area associated with a specific File Handle (i.e. cache memory), 806. Since the original data still exists on the storage device, the data in the memory area at the specific File Handle indicates a copy of the file data. In general, the method of watermarking may depend on the file type (e.g., text, jpeg, PDF, PowerPoint, bitmap, etc.). Therefore, the file type may be obtained to help determine the method of watermarking, 807. The method of watermarking is defined and the prepared watermark is inserted into the data, 808. The process returns to other normal operations in the file read process, 809.

Figure 9:
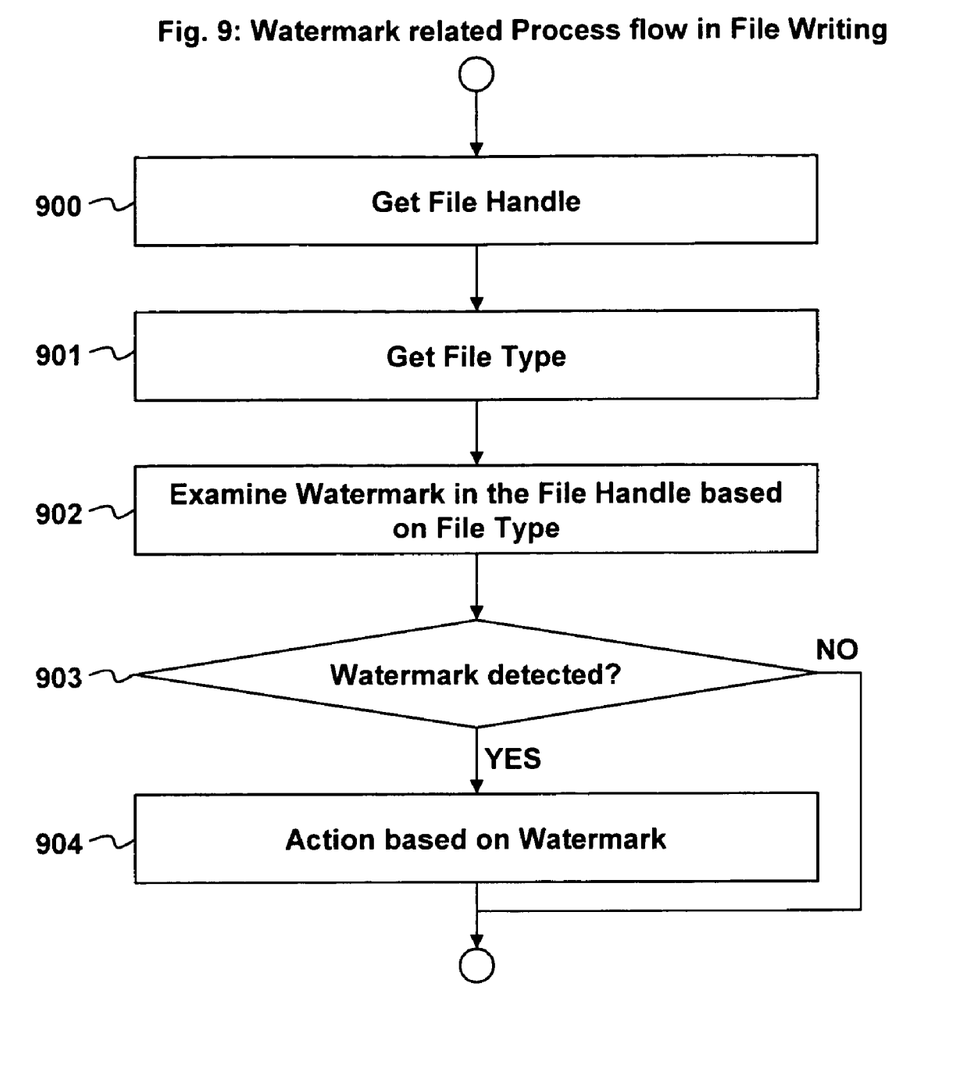
FIG. 9 is a flowchart of a file writing process according to an example embodiment of the present invention.

FIG. 9 shows a flowchart of a file writing process according to an example embodiment of the present invention. This file writing process may occur in the file server 100, however, the present invention is not limited by this embodiment or implementation. The File Handle that will be saved, for example into the storage devices, is obtained, 900. Since the method of watermarking may depend on the file type, the method of examining watermarks may also depend on the file type. Therefore, the file type may be obtained from metadata, 901. The watermark in the File Handle is examined, 902. In another embodiment, the process may try all possible methods of examination to determine whether the metadata itself is watermarked. The result of the examination is checked, 903. If any watermarks are detected from the file, a pre-defined action may be executed, 904, otherwise, the process returns to the normal file writing process.

The process executes an action based on the detected watermark and the pre-defined policies or rules. The policies or rules may be included in the watermark. Examples of the action are: refusing the file write request and returning an alert message, accepting the file write request but destroying the file itself in the file server, sending a message to an appropriate authority to notify a possible copyright violation, and so on.

Figure 10:
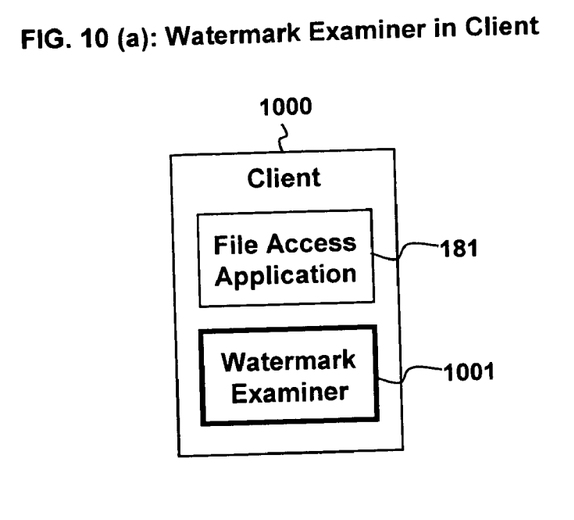
FIGS. 10(a)-(c) are diagrams of possible locations of the watermark examiner according to example embodiments of the present invention.

FIGS. 10(*a*)-(*c*) show diagrams of possible locations of the watermark examiner according to example embodiments of the present invention. In one embodiment, the client itself may contain the process of examining watermark as shown in FIG. 10(*a*). The watermark examiner 1001 may contain the watermark examination procedure 141 and the action procedure 142 as shown in FIG. 1. This allows a client device to determine whether an accessed file contains a watermark and to take an appropriate action accordingly. This is advantageous if the client device desires to forward the watermark file to other devices and wants to insure that these other devices are aware that the file contains a watermark and, therefore, may be copyrighted or contain some other protections or restrictions.

In another embodiment, a gateway server may be capable of examining the watermark, as shown in FIG. 10(*b*). In this embodiment a gateway server, that may reside between and interconnect local area networks (LANs) to wide area networks (WANs) (not shown), may contain a watermark examiner 1011. The watermark examiner 1011 may also contain the watermark examination procedure 141 and the action procedure 142 as shown in FIG. 1. This capability allows a gateway server to determine whether an accessed file contains a watermark and to take an appropriate action accordingly. However, the gateway server 1010 may or may not contain the procedures associated with a file reading process 130 as shown in FIG. 1.

In still another embodiment of the present invention, the file server itself may contain a process of examining a watermark, as shown in FIG. 10(*c*). The watermark examiner 0121 may contain the watermark examination procedure 141 and the action procedure 142 as shown in FIG. 1. This allows a file server 1020 to determine whether a written file contains a watermark and to take an appropriate action accordingly. However, in this embodiment, the file server 1020 does not contain the procedures associated with a file reading process 130 as shown in FIG. 1. The embodiments shown in FIGS. 10(*a*)-(*c*) may require more strict usage of the data with copyright, as detecting violation mechanisms are enhanced.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for watermarking in accessed data comprising:
 a client device, the client device connected to a network and including a file access application;
 a file system manager, the file system manager connected to the network and setting watermark control information;
 a file server, the file server connected to the network and including:
  a file writing process, the file writing process including a file watermark examination procedure and an action procedure, the action procedure determining an action based on a result of the file watermark examination, and a file reading process, the file reading process including a watermark definition procedure, a file handle/memory preparation procedure, a file data copy procedure, and a watermark insertion procedure, and a storage network, the storage network operatively connected to the file server and including at least one storage device, wherein during a read request the watermark definition procedure determines whether a file to be read is to be watermarked with a watermark based on a user at the client device that requested to read the file, and during a write request, the file watermark examination procedure determining whether the write request is processed or not based on the user and whether the file to be written contains a watermark.

2. The system according to claim 1, wherein the file handle/memory preparation procedure creates a memory space and a specific file handle pointing to the memory space, the file data copy procedure copying data from the file to be read into the memory space if the watermark definition procedure determines that the file to be read is to be watermarked.

3. The system according to claim 2, wherein the watermark insertion procedure inserts a watermark into the copy of the file data stored into the memory area if the file is to be watermarked.

4. The system according to claim 3, wherein the inserted watermark is defined by the watermark definition procedure based on the watermark control information that is stored at the server.

5. The system according to claim 1, the server further comprising an access control list containing information defining access control from a user for a file.

6. The system according to claim 1, wherein the watermark provides copyright protection for the file to be read and the file to be written.

7. The system according to claim 1, wherein the system is one of a Network Attached Storage (NAS) system or a Content Addressable Storage (CAS) system.

8. The system according to claim 1, wherein the watermark is defined based on a file being accessed and a user accessing to the file.

9. The system according to claim 1, wherein the watermark comprises at least one of copyright information, file content information, and use right information.

10. The system according to claim 9, wherein the copyright information comprises at least one of copyright holder, copyright date, and copyright notice.

11. The system according to claim 9, wherein the file content information comprises at least one of file name, file type, and description.

12. The system according to claim 9, wherein the use right information comprises at least one of user, date of use, period of use, type of use, and process after use.

13. The system according to claim 1, wherein the action procedure determines the action based on rules contained in a watermark detected during the file watermark examination.

14. The system according to claim 1, wherein the action comprises at least one of refusing the file write request and returning an alert message, accepting the file write request but destroying the file itself in the file server, or sending a message to an appropriate authority to notify a possible copyright violation.

15. A method for file read watermarking comprising:
receiving a file open request for a file from a client;
defining a watermark for the file based on watermark control information from a user;
preparing, if the watermark is required, a specific file handle and memory area and sending the specific file handle to the client;
copying the file to a second file at the specific file handle and memory area;
inserting the watermark into the second file;
receiving a file read request from the client including the specific file handle; and
accessing data in the second file using the specific file handle and sending the data to the client.

16. The method according to claim 15, further comprising receiving a file close request including the specific file handle from the client and executing a file close procedure for the second file.

17. The method according to claim 15, wherein the file open request includes a file name and one of a user ID or a session ID indicating a user ID.

18. The method according to claim 17, further comprising searching the watermark control information using the file name and the user ID and defining the watermark for the file based on a result of the searching.

19. The method according to claim 15, wherein the specific file handle and memory area both reside in a cache memory.

20. The method according to claim 15, further comprising obtaining a file type of the file and inserting the watermark into the second file based on the file type.

21. A computer-readable medium having computer-executable instructions for performing a method for detecting watermarking comprising:
receiving a file create request for a file from a client, the file create request including a file name and one of a user ID or a session ID indicating a user ID;
executing a file create procedure to obtain a file handle based on the file name and sending the file handle for the file to the client;
receiving a file write request including the file handle and data from the client;
executing a file write process to the file and sending a completion status to the client;
receiving a file close request from the client including the file handle;
determining a file type of the file;
examining the file to determine if a watermark exists; and
performing an appropriate action based on the examining.

22. The computer-readable medium according to claim 21, wherein the action comprises completing a file close process and writing the data to the file if the file does not contain a watermark.

23. The computer-readable medium according to claim 21, wherein the action comprises executing a predefined action if the file contains a watermark.

24. The computer-readable medium according to claim 23, further comprising checking predefined policies or rules to determine the predefined action.

25. The computer-readable medium according to claim 23, wherein the predefined action comprises not writing the data to the file and sending a write fail status to the client.

26. A file server, the file server connected to a network and including a file reading process, the file reading process including:
a watermark definition procedure, during a read request, the watermark definition procedure determining whether a file to be read is to be watermarked and defining a watermark, based on a user at a client device that requested to read the file;

a file handle/memory preparation procedure, the file handle/memory preparation procedure creating a memory space and a specific file handle pointing to the space if the watermark definition procedure determines that the file to be read is to be watermarked;

a file data copy procedure, the file data copy procedure copying data from the file to be read into the memory space if the file is to be watermarked; and a watermark insertion procedure, the watermark insertion procedure inserting the watermark into the copy of the file data stored into the memory space if the file is to be watermarked.

* * * * *